US008054190B2

(12) United States Patent
Hobelsberger

(10) Patent No.: US 8,054,190 B2
(45) Date of Patent: Nov. 8, 2011

(54) APPARATUS FOR MONITORING OF BRUSHES, IN PARTICULAR SLIPRING OR COMMUTATOR BRUSHES, ON ELECTRICAL MACHINES

(75) Inventor: Max Hobelsberger, Wuerenlingen (CH)

(73) Assignee: Alstom Technology Ltd, Baden (CH)

( * ) Notice: Subject to any disclaimer, the term of this patent is extended or adjusted under 35 U.S.C. 154(b) by 362 days.

(21) Appl. No.: 12/333,573

(22) Filed: Dec. 12, 2008

(65) Prior Publication Data
US 2009/0153089 A1 Jun. 18, 2009

(30) Foreign Application Priority Data

Dec. 13, 2007 (DE) .......................... 10 2007 055 795

(51) Int. Cl.
G08B 21/00 (2006.01)
(52) U.S. Cl. ......................................... 340/648; 340/679
(58) Field of Classification Search .................. 340/648, 340/635, 679; 310/245, 249, 242, 238, 239, 310/246, 247
See application file for complete search history.

(56) References Cited

U.S. PATENT DOCUMENTS

| 4,316,186 | A | * | 2/1982 | Purdy et al. ................... 340/648 |
| 4,333,095 | A | * | 6/1982 | Silva ............................. 340/679 |
| 4,636,778 | A | * | 1/1987 | Corkran et al. ............... 340/648 |
| 4,739,208 | A | | 4/1988 | Kimberlin |
| 4,950,933 | A | | 8/1990 | Pipkin et al. |
| 5,731,650 | A | * | 3/1998 | Scheucher ..................... 310/248 |
| 5,753,995 | A | * | 5/1998 | Ogino ........................... 310/242 |
| 5,870,026 | A | * | 2/1999 | Challenger .................... 340/648 |
| 6,255,955 | B1 | * | 7/2001 | Blaettner ....................... 340/648 |
| 7,705,744 | B2 | * | 4/2010 | Cutsforth .................. 340/686.1 |

* cited by examiner

Primary Examiner — Toan N Pham
(74) Attorney, Agent, or Firm — Buchanan Ingersoll & Rooney PC

(57) ABSTRACT

An apparatus is disclosed for monitoring brushes, such as slipring or commutator brushes, on electrical machines. At least one electronic sensor is configured to be arranged in or on a brush apparatus of an electrical machine such that an electrical supply power can be locally drawn directly from an electromagnetic environment of the brush apparatus. The apparatus can transmit measurement data detected by it by electromagnetic radiation to an indication device.

19 Claims, 2 Drawing Sheets

APPARATUS FOR MONITORING OF BRUSHES, IN PARTICULAR SLIPRING OR COMMUTATOR BRUSHES, ON ELECTRICAL MACHINES

RELATED APPLICATION

This application claims priority under 35 U.S.C. §119 to German Patent Application No. 10 2007055795.9 filed in Germany on Dec. 13, 2007, the entire content of which is hereby incorporated by reference in its entirety.

TECHNICAL FIELD

An apparatus for monitoring of brushes is disclosed, such as slipring or commutator brushes, on electrical machines such as generators.

BACKGROUND INFORMATION

Large electrical generators or motors can include sliprings or commutators and associated brushes, via which the field current or drive current is supplied. These brushes can be manufactured from carbon and graphite materials and are subject to relatively high wear. For smooth operation of an electrical machine with brushes such as these, it is desirable to monitor the brushes, in particular the brush wear, as continuously as possible.

U.S. Pat. Nos. 4,950,933 and 4,739,208 have disclosed apparatuses in order to monitor the length of slipring brushes for a predetermined minimum value. When the predetermined minimum value is undershot, this mechanically or magnetically initiates a closing or opening process of an electrical contact. The closing or opening of the electrical contact is detected, and is indicated by a signal. It is therefore possible to determine, in the form of a length statement, whether the brushes have or have not undershot the length limit value.

U.S. Pat. No. 5,870,026 discloses an apparatus by which the instantaneous, still remaining length of a brush can be output as an analog value. For this purpose, a resistance element is embedded in the brush and is shortened as it wears away. The resistance, which changes as it wears away, is used as a measure of the length of the brush.

However, in these known apparatuses, in some cases, only a local indication of the fault state, that is to say of a worn-out brush, is provided. Since the brush apparatuses of electrical machines can be in a closed form, this indication can easily be overlooked, or cannot be monitored so easily by maintenance personnel.

In some cases, remote indication is admittedly also made possible, although electrical signal connections are then used for this purpose via cables from the outside to the brush apparatus. Because of the generally high electrical voltage and the high potential energies which exist in electrical machines, for example in the case of an electrical generator, when in the energized state, this results, however, in a major potential danger. Measures to cope with this potential change are generally quite complex.

SUMMARY

An apparatus for monitoring a brush of an electrical machine, comprising: at least one electronic sensor configured to be arranged in or on a brush apparatus of an electrical machine such that an electrical supply power can be locally drawn directly from an electromagnetic environment of the brush apparatus; and means to transmit detected measurement data by electromagnetic radiation to an indication device.

BRIEF DESCRIPTION OF THE DRAWINGS

Further advantages and application options of the present disclosure will become evident from the following description in conjunction with the exemplary embodiments which are illustrated in the drawings.

The expressions and associated reference symbols shown in the list of reference symbols provided further below are used in the description, in the claims, in the abstract and in the drawings.

Identical and/or functionally identical elements can be provided with the same reference symbols.

In the drawings

FIG. 1 shows a first exemplary embodiment of an apparatus for monitoring of a slipring brush according to the disclosure, in which a sensor is fed from the voltage drop across the slipring brush; and FIG. 2 shows a second exemplary embodiment of an apparatus for monitoring of a slipring brush according to the disclosure, in which a sensor is fed via an HF coupling coil.

DETAILED DESCRIPTION

Figure 1:
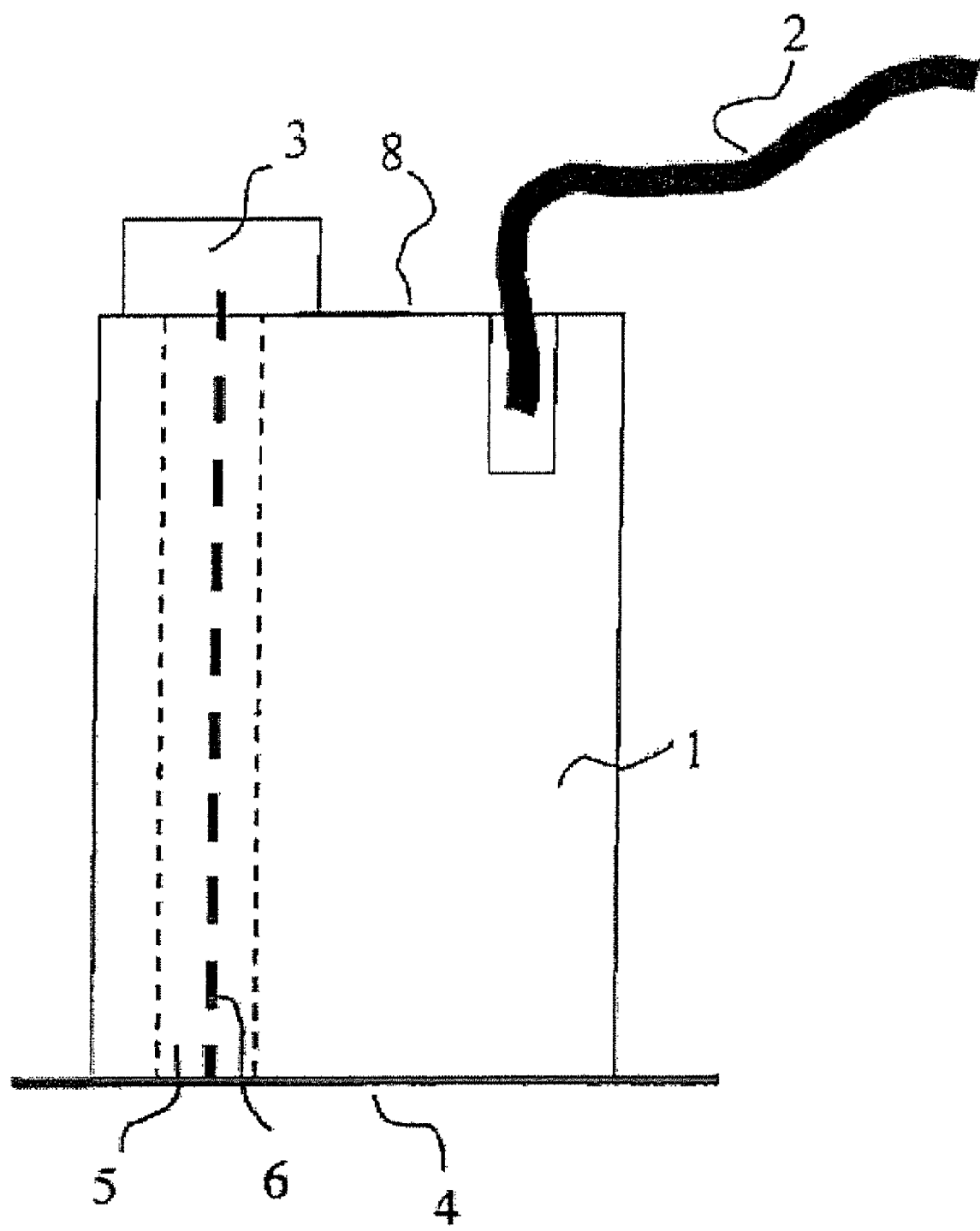

An apparatus is disclosed for monitoring of brushes, such as slipring or commutator brushes, on electrical machines which can allow safe continuous remote monitoring of a brush.

In an exemplary embodiment, an electronic sensor is configured to be arranged in or on the brush apparatus of an electrical machine, which electronic sensor locally draws its supply power directly from an electromagnetic environment of the brush apparatus and transmits detected measurement data by means of electromagnetic radiation, that is to say without using electrical signal or connecting lines. One exemplary principle of the disclosure is, inter alia, the knowledge that, in principle, voltage sources are already available for supplying power to the electronic sensor in the brush apparatus.

On the one hand, according to an exemplary embodiment of the disclosure, the voltage drop across a brush can be used to supply voltage to the sensor. On the other hand, according to another embodiment of the disclosure, the high-frequency component of the field current flowing via a brush can also be used to supply voltage for the sensor. Particularly when, according to an embodiment of the disclosure, the electronic sensor is integrated directly on a CMOS chip, even small voltages are sufficient to operate the sensor.

Furthermore, according to an embodiment of the disclosure, voltage converters can be used which transform a relatively small voltage drop up to a supply voltage which is suitable for the sensor. According to an embodiment of the disclosure, small radio transmitters can likewise be used for the sensor, via which measurement data is transmitted by means of electromagnetic radiation and which operate reliably with a voltage even of a few volts, for example near-field communication (NFC) circuits. In this case, according to exemplary embodiments of the disclosure, the radio transmission can take place in the Gigahertz range, for example by means of Bluetooth® or ZigBee® technology.

The disclosure allows remote monitoring of a brush of an electrical machine with little potential danger in comparison to that of the solutions mentioned initially. A plurality of electronic sensors may, of course, also be used for remote monitoring of one or more brushes of an electrical machine.

According to one embodiment of the disclosure, an apparatus is provided for monitoring of brushes, such as slipring or commutator brushes, on electrical machines, having
 a brush apparatus and
 at least one electronic sensor configured to be arranged in or on the brush apparatus and to locally draw electrical supply power directly from the electromagnetic environment of the brush apparatus, and to transmit detected measurement data by means of electromagnetic radiation. In an apparatus such as this, there is therefore no need for an electrically conductive signal or connecting lines to the sensor for remote monitoring of a brush in the brush apparatus, as a result of which the potential hazard resulting from the high electrical voltages and potentials which generally occur in electrical machines can be reduced considerably in comparison to remote monitoring solutions in which electrical signal or connecting lines are used. In this case, the expression "brush apparatus" means in particular not only a pure brush, such as a slipring or commutator brush, but also a brush together with a brush housing.

According to a further embodiment of the disclosure, the electronic sensor can be electrically connected only to one electrical pole of the brush apparatus. This means that there is no need for any connection to the other pole.

According to an embodiment of the disclosure, the electronic sensor can be supplied by the voltage drop produced on a brush, for example by converting the voltage drop across a voltage converter of the sensor to an electrical voltage which is suitable for supplying the sensor. With regard to the voltage drop, it is known, for example in the case of the operating current densities which occur with known electrical machines that an electrical voltage of about 1 V to 2 V (Volts) will be dropped on a brush and, furthermore, this voltage drop is generally constant over a wide range of operating current densities. By way of example, a voltage drop such as this can be transformed up by a voltage converter, which operates reliably even from 0.9 V, to the normal operating voltage of 5 V for digital electronic circuits. By way of example, this allows a digital sensor circuit and a radio circuit such as a Bluetooth® or ZigBee® module to be operated reliably.

According to a further embodiment of the disclosure, the brush may be an auxiliary brush which makes contact with a slipring of an electrical machine and via which only the electrical current which is used to supply the electronic sensor flows. By way of example, the auxiliary brush can be used to ensure that only a small electrical current, which is sufficient to supply the sensor, is used to feed the sensor.

According to a further embodiment of the disclosure, the other pole of the electronic sensor can then be connected to a brush holder via which the field current is fed to the main brushes of the electrical machine. The voltage which is also dropped across the main brushes is thus supplied for feed purposes to the sensor, while the current through the auxiliary brush is limited.

According to an embodiment of the disclosure, the auxiliary brush can fill the entire area of the brush holder, and its dimensions may correspond approximately to the dimensions of the main brushes. This can lead to manufacturing advantages, since the auxiliary brush in principle corresponds to a main brush, and the same brush housing can therefore be used for both brush types.

According to a further embodiment of the disclosure, the auxiliary brush can also be embedded in a main brush and can be electrically insulated from it, thus making it possible to achieve a brush apparatus that is very compact.

According to another embodiment of the disclosure, a coupling coil can be placed close to or around the power supply cable for a brush or around the main cable of the pole connection, with an electrical voltage which is induced in the coupling coil being used to supply the electronic sensor. This makes use of the high-frequency component which is generally contained in the field current of an electrical machine in order to feed electrical power to the sensor. The coupling coil may be in the form of a conductor loop, for example similar to a uniform-field coil by which means the changing magnetic field of the current supply to the electrical machine induces an electrical voltage in this conductor loop.

According to an embodiment of the disclosure, the coupling coil can be designed such that an output is produced above about 50 kHz (kilohertz). Particularly in the case of generators with solid-state excitation, the rotor losses can result in a not inconsiderable high-frequency (HF) current flowing through the field cable of a generator. In this case, the expression high-frequency means in particular the range from a few 100 Hz (Hertz) up to several 100 kHz. If the output is above 50 kHz, as in the case of the embodiment of the disclosure described above, the dimensions of the coupling coil can be kept small.

According to an embodiment of the disclosure, furthermore, a high-frequency transformer can be provided in order to increase the electrical voltage which is induced in the coupling coil. This may be advantageous for the use of a voltage converter, since a higher-frequency voltage can be transformed more easily to a higher voltage.

Furthermore, according to an embodiment of the disclosure, the coupling coil may be in the form of an output coil which is designed in accordance with the principles of operation of a Tesla transformer as a weakly coupled resonant circuit.

According to an embodiment of the disclosure, each main brush of an electrical machine may be equipped with its own electronic sensor. According to an alternative embodiment of the disclosure, in each case one electronic sensor can also be provided for each winding pole of an electrical machine.

An exemplary embodiment of the disclosure also relates to an electronic sensor for an apparatus according to the disclosure, and as described above, in which the electronic sensor is designed as means, or to include means, to transmit the measurement data detected by it by radio or optically. Optical transmission may take place, for example, by means of an optical waveguide such as a glass fiber cable. Infrared transmission would also be feasible, for example, when there is a direct line-of-sight connection. Transmission by radio may take place, for example, in GHz (Gigahertz) range, in particular by means of an NFC technology such as Bluetooth® or ZigBee®.

According to an embodiment of the disclosure, the electronic sensor may be designed to measure one or more of the following parameters of the brush: brush temperature, vibrations, voltage drop, brush length, spark activity. The sensor may, of course, also be designed to measure only the brush length and thus brush wear. However, if the sensor is based on large-scale-integrated circuit technology, it is in principle possible to integrate a large number of measurement functions at relatively little cost. This makes it possible to provide large-scale-integrated and universal brush monitoring.

According to an embodiment of the disclosure, the electronic sensor may be integrated directly on a CMOS chip which also has a voltage converter which is designed to prepare the feed voltage for the electronic sensor. CMOS (Complementary Metal-Oxide Semiconductor) circuit technology, such as digital CMOS circuit technology, is distinguished by a low current draw, which may be highly advantageous for the autonomous voltage supply for the sensor in the brush apparatus, without any additional separate voltage source, for reliable sensor operation.

FIG. 1 shows a slipring carbon brush 1 of a brush apparatus of an electrical machine, to which a power cable 2 is connected, via which, for example, a field current flows for the electrical machine. The brush 1 has an upper contact surface 8 on which the power cable 2 makes contact with the brush 1, and a further contact surface which makes electrical contact with the surface 4 of the slipring of the electrical machine.

A resistance element 5 is arranged in an electrically insulated manner in the brush 1 and is used to measure the length of the brush body by determining the resistance value of the element 5. For this purpose, the resistance of the resistance element 5 is first of all measured, and is then associated with a corresponding brush length. The resistance element 5 is electrically isolated from the surrounding brush body 1 by an insulation layer.

An electronic sensor 3 is configured to be arranged on the brush 1, and one of its poles makes electrical contact in order to supply voltage, with a contact pin 6 which is arranged in an insulated manner in the resistance element 5. The contact pin 6 has a low resistance and is soft, for example by being manufactured from copper or graphite, and is used to make contact with the slipring surface 4. It is isolated from the surrounding resistance element 5 by an electrically insulated layer. The sensor 3 is fed with the voltage which is present between the pin 6 and the surface 8.

Figure 2:
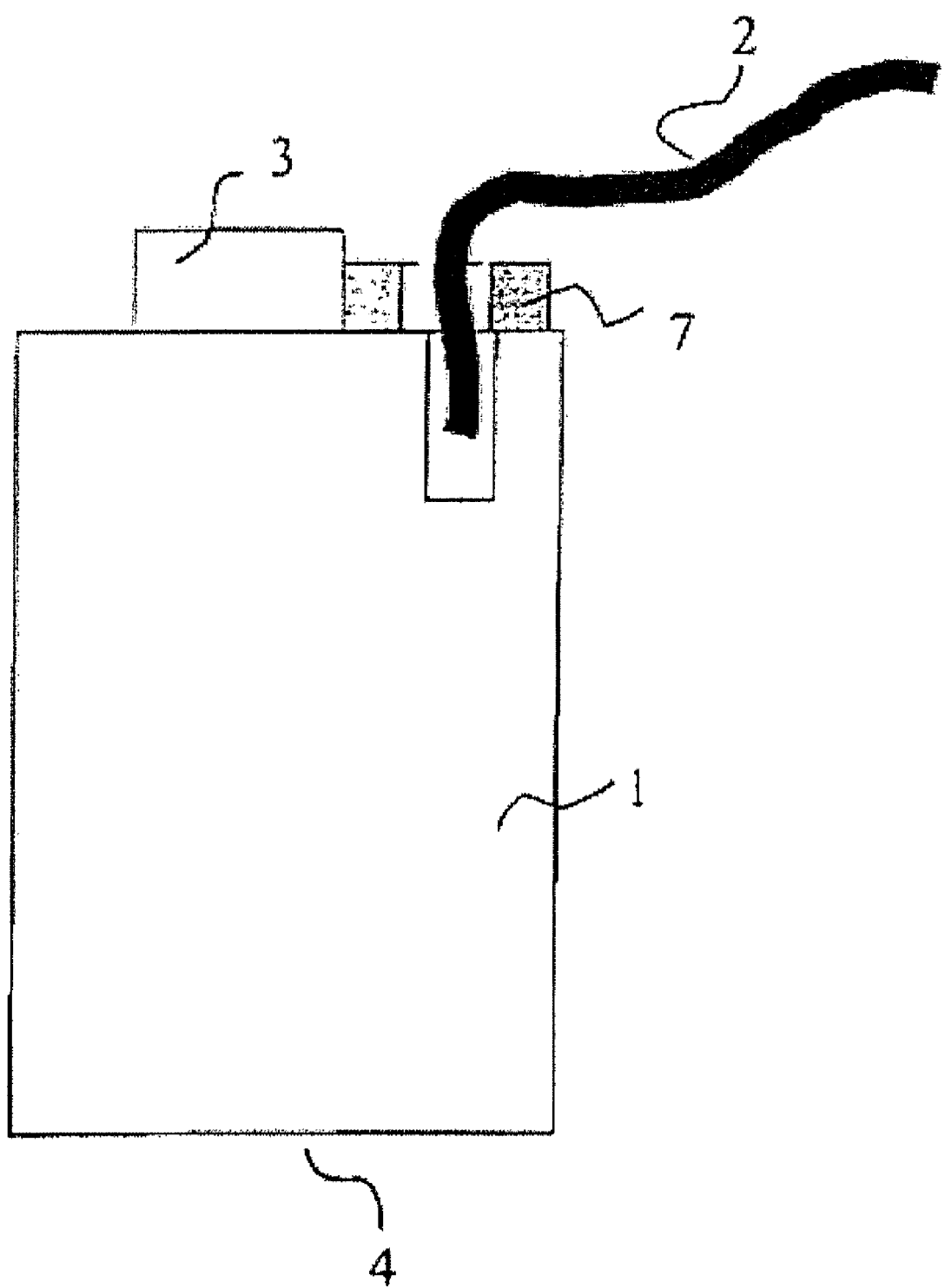

FIG. 2 likewise shows a slipring carbon brush 1 of a brush apparatus of an electrical machine to which a power cable 2 is connected, via which, for example, a field current for the electrical machine flows. An electronic sensor 3 is arranged on the brush 1. In this case, the sensor 3 is supplied with electrical voltage via an HF coupling coil 7 which is placed around the power cable 2. The high-frequency component of the electrical current flowing through the power cable 2 induces an electrical voltage in the HF coupling coil 7, and this electrical voltage is used to supply voltage to the sensor 3.

In summary, exemplary embodiments of the disclosure are distinguished by one or more of the following exemplary features:
- the power for feeding the sensor is drawn from the local electromagnetic environment of the brush, without any electrical connection to the other pole or to outside the brush holder being available for feed purposes.
- in an exemplary embodiment of the disclosure, the voltage which is dropped across the carbon brush during operation is used to feed the sensor. It is essentially the voltage which occurs approximately between the slipring surface and the upper brush surface.
- in another embodiment of the disclosure, the alternating component, specifically the high-frequency component, of the brush current is used in order to feed the sensor. The alternating component is output inductively.
- the sensor transmits measurement data by means of radio or via optical media to an indication station.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SYMBOLS

1 Carbon brush
2 Power cable for field current
3 Electronic sensor
4 Contact surface of the slipring of an electrical machine
5 Resistance element
6 Contact pin
7 HF coupling coil
8 Upper surface of the carbon brush 1

What is claimed is:

1. An apparatus for monitoring a brush of an electrical machine, comprising:
at least one electronic sensor configured to be arranged in or on a brush apparatus of an electrical machine such that an electrical supply power can be locally drawn directly from an electromagnetic environment of the brush apparatus; and
means to transmit detected measurement data by electromagnetic radiation to an indication device, wherein
the brush is an auxiliary brush which makes contact with a slipring of the electrical machine and via which only electrical current used to supply the electronic sensor flows.

2. The apparatus as claimed in claim 1, wherein
the electronic sensor is configured to be electrically connected only to one electrical pole of the brush apparatus.

3. The apparatus as claimed in claim 1 in combination with a brush apparatus of an electrical machine, wherein
the electronic sensor is configured to be supplied by a voltage drop of a brush.

4. The apparatus as claimed in claim 1, wherein
a pole of the electronic sensor is connected to a brush holder via which field current is fed to main brushes of the electrical machine.

5. The apparatus as claimed in claim 4, wherein
the auxiliary brush fills an entire area of the brush holder, and dimensions of the auxiliary brush correspond approximately to dimensions of a main brush.

6. The apparatus as claimed in claim 4, wherein
the auxiliary brush is embedded in a main brush and is electrically insulated from it.

7. The apparatus as claimed in claim 1 in combination with an electrical machine, wherein
each main brush of the electrical machine is equipped with its own electronic sensor.

8. The apparatus as claimed in claim 1 in combination with an electrical machine, wherein
in each case one electronic sensor is provided for each winding pole of an electrical machine.

9. An apparatus for monitoring a brush of an electrical machine, comprising:
at least one electronic sensor configured to be arranged in or on a brush apparatus of an electrical machine such that an electrical supply power can be locally drawn directly from an electromagnetic environment of the brush apparatus; and
means to transmit detected measurement data by electromagnetic radiation to an indication device, and
a coupling coil arranged close to or around a power supply cable for a brush or around a main cable of a pole connection, and configured such that an electrical voltage which is induced in the coupling coil will supply the electronic sensor.

10. The apparatus as claimed in claim 9, wherein
the coupling coil is designed such that an output is produced above about 50 kHz.

11. The apparatus as claimed in claim 9, comprising:
a high-frequency transformer to increase electrical voltage induced in the coupling coil.

12. The apparatus as claimed in claim 9, wherein
the coupling coil is an output coil which is designed in accordance with principles of operation of a Tesla transformer as a weakly coupled resonant circuit.

13. An electronic sensor for an apparatus as claimed in claim 1, wherein
the electronic sensor is configured to transmit the measurement data detected by it by radio or optically.

14. The electronic sensor as claimed in claim 13, wherein
the electronic sensor is configured to measure one or more of the following parameters of the brush: brush temperature, vibration, voltage drop, brush length, spark activity.

15. An apparatus for monitoring a brush of an electrical machine, comprising:
at least one electronic sensor configured to be arranged in or on a brush apparatus of an electrical machine such that an electrical supply power can be locally drawn directly from an electromagnetic environment of the brush apparatus; and
means to transmit detected measurement data by electromagnetic radiation to an indication device, wherein
the electronic sensor is integrated directly on a CMOS chip which also has a voltage converter which is configured to prepare a feed voltage for the electronic sensor.

16. An apparatus for monitoring a brush of an electrical machine, comprising:
at least one electronic sensor configured to be arranged in or on a brush apparatus of an electrical machine such that an electrical supply power can be locally drawn directly from an electromagnetic environment of the brush apparatus; and
means to transmit detected measurement data by electromagnetic radiation to an indication device, wherein
a coupling coil is arranged close to or around a power supply cable for a brush or around a main cable of a pole connection, and configured such that an electrical voltage which is induced in the coupling coil will supply the electronic sensor.

17. The apparatus as claimed in claim 16, comprising:
a high-frequency transformer to increase electrical voltage induced in the coupling coil.

18. The apparatus as claimed in claim 17, wherein
each main brush of the electrical machine is equipped with its own electronic sensor.

19. The apparatus as claimed in claim 17, wherein
in each case one electronic sensor is provided for each winding pole of an electrical machine.

\* \* \* \* \*